United States Patent [19]

Becker et al.

[11] Patent Number: 5,019,413

[45] Date of Patent: May 28, 1991

[54] PROCESS FOR IMPROVING THE QUALITY OF ROBUSTA COFFEE

[75] Inventors: Rainer Becker, Verden; Brigitte Schlabs, Bremen; Claus Weisemann, Verden, all of Fed. Rep. of Germany

[73] Assignee: Jacobs Suchard AG, Zurich, Switzerland

[21] Appl. No.: 601,301

[22] Filed: Oct. 22, 1990

[30] Foreign Application Priority Data

Oct. 28, 1989 [DE] Fed. Rep. of Germany ....... 3936020

[51] Int. Cl.$^5$ .......................... A23F 5/02; A23F 5/16
[52] U.S. Cl. .................................. 426/460; 426/595; 426/461; 426/466; 426/469
[58] Field of Search ............... 426/595, 460, 461, 466, 426/469

[56] References Cited

U.S. PATENT DOCUMENTS 3,640,726  2/1972  Bolt et al. ........................... 426/595
4,540,591  9/1985  Dar et al. ......................... 426/466 X

*Primary Examiner*—Joseph Golian
*Attorney, Agent, or Firm*—Burns, Doane, Swecker & Mathis

[57] ABSTRACT

The quality of Robusta coffee is increased by treating raw Robusta coffee beans whose water content has been increased to about 30% to 45% with steam at about 135° C. to 140° C. and at a pressure ranging from 3 bar to 4 bar approx. for 60 min to 120 min. This treatment particularly removes the substance responsible for the "earthy" and "musty" aroma note of Robusta coffee, namely the compound 2-methylisoborneol. After the treatment, the beans are processed and roasted in the customary way.

19 Claims, 1 Drawing Sheet

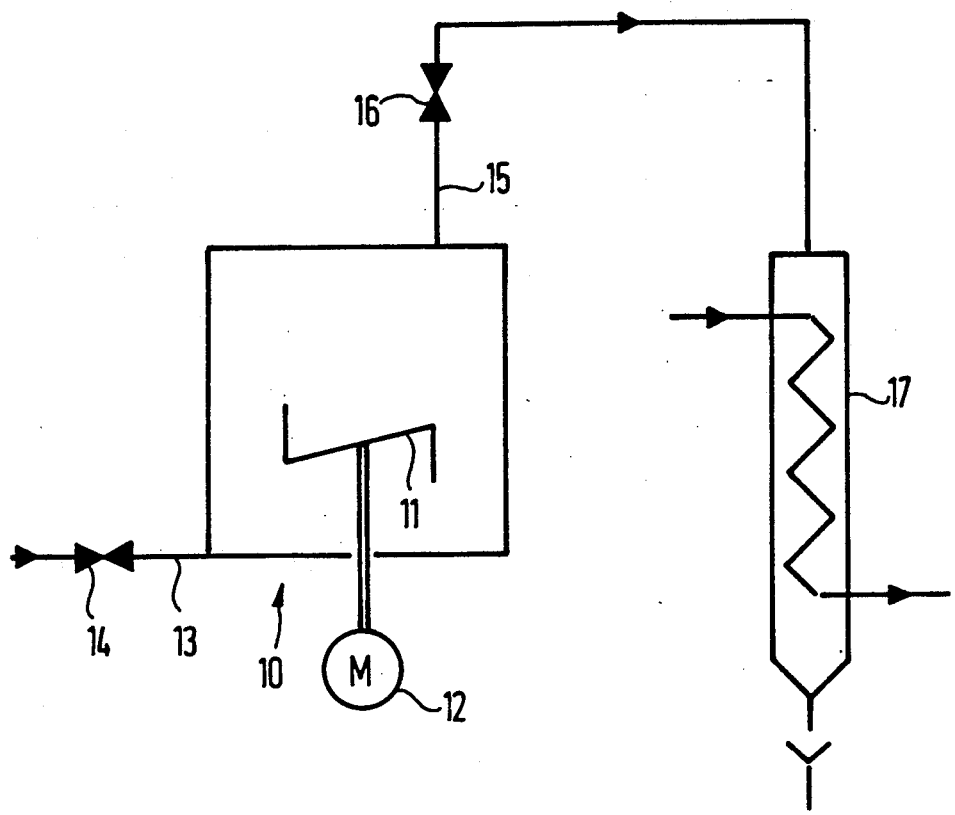

PROCESS FOR IMPROVING THE QUALITY OF ROBUSTA COFFEE

The invention relates to a process for improving the quality of Robusta coffee by treating raw Robusta coffee beans with steam at elevated temperatures and elevated pressure and subsequently roasting the steam-treated beans.

Robusta coffees are cultivated in areas of lower altitudes. They have a strong and powerful taste, but also possess an "earthy" and "musty" flavor note which is found undesirable in many consuming countries. Due to their strong basic a taste and high caffeine contents, Robusta coffees are often blended with mild coffee varieties (e.g. Arabica coffee) to a considerable extent in order to intensify the taste and increase the caffeine content of the end product.

The "earthy" and "musty" flavor note undesirable in many consuming countries can even be noticed sensorially if there is only a small share of Robusta coffee in the blend. The coffee industry has therefore long been trying to find ways of improving the organoleptic properties of Robusta coffee.

A known process claiming to improve the quality of coffee is disclosed in DE-AS 576 515. The process comprises exposing raw coffee beans being moved about to steam at a pressure of 1-3 atm. for at least 1 hour until a water quantity of 6% to 10% is absorbed.

A more recent process for upgrading the quality of green coffee beans is subJect matter of EP-A-234 712. The process comprises the following steps:

Steam-treating the green beans at about 258° F. to 316° F.—corresponding to about 126° C. to 158° C.—at a pressure of 20 psi to about 70 psi-corresponding to about 1.4 bar to about 5 bar—for a time period of 0.5 min to about 3 min;

subsequently moistening the coffee beans with water for a time period of 0.5 min to 2 min;

again treating the coffee beans with steam at a pressure of 1.38 bar to 5 bar for a time period of 0.5 min to 4 min;

roasting the beans.

The above-recited processes noticeably improve the quality of coffees of various varieties or origins. However, the s upgrading of Robusta coffees treated according to these known processes is unsatisfactory. They still have a certain unpleasant aroma note adversely affecting their quality quite substantially.

The present invention therefore has the object to provide a process specifically for improving the quality of Robusta coffee.

This object is attained by increasing the water content of the Robusta coffee beans to a level of 30% to 45% and then treating the coffee beans with saturated steam having a temperature of 135° C. to 140° C. at a pressure of 3 bar to 4 bar for a period of 40 min to 120 min, especially for removing 2-methylisoborneol, the constituent substance found to be the key compound responsible for the Robusta aroma.

In the process as taught by the invention, first the water content of the green Robusta coffee beans is substantially increased compared to the natural water content normally about 8% to 12% —, specifically to a water content of 30% to 45%. Subsequently the beans are treated with saturated steam at elevated pressure. For attaining the object of the invention it is important to observe the limits of the process parameters, i.e. the temperature range of the saturated steam, the pressure range and the duration of treatment.

Optimum results are achieved, if the saturated steam treatment is conducted at about 138° C. and at a pressure of 3.1 bar to 3.6 bar for a period of 75 min to 90 min.

The first process step of increasing the water content of the Robusta coffee beans can be conducted in different ways.

According to a preferred embodiment of the invention, the raw Robusta coffee beans having a low water content are treated with steam in a pressure vessel for a period of about 20 min, the temperature of the steam being increased to about 135° C. and the pressure rising herewith to about 3.1 bar. Expediently, the raw coffee beans are kept moving continuously, so that the water is evenly absorbed. When the water content of the beans has reached the necessary level (of about 30% to 40%), the (upper) valve of the pressure vessel is opened and the treatment with saturated steam as taught by the invention commenced. Obviously, raw Robusta coffee beans which have been treated with any other method to raise the water content to a level of 30% to 45% beforehand can also be charged to an appropriate pressure vessel to start the process as taught by the invention. Then, the saturated steam is passed through the beans at a temperature within the small range of 135° C. to 140° C.—preferably at about 138° C.—and at a pressure of about 3 bar to 4 bar—preferably ranging from about 3.1 to 3.6 bar—for a time period of about 60 min to 120 min—preferably for about 75 min to 90 min. Although not absolutely necessary, it is preferred to constantly move about the beans during steaming because this ensures a more uniform treatment.

After the treatment is completed, the flow of steam is stopped, but the steam still present in the pressure vessel is further drawn off for a period of preferably 5 min to 10 min. thus equalizing the pressure.

Subsequently, the beans are dried to a moisture content of expediently about 8% to 12%. The customary drying methods may be employed for this drying process. Redrying the beans to a water content of about 8% to 12% has the advantage of not having to immediately roast the steamed beans, but being able to store them like non-steamed raw coffee beans for a certain time. The steam-treated raw coffee beans redried to the above-specified water content can be roasted by means of the customary roasting techniques. Preferably the steamed and dried raw coffee beans are roasted in a fluidized bed roaster by introducing hot roasting gases until the beans have the desired color value.

Alternatively, the invention proposes to increase the water content of ordinary raw coffee beans to a level within the range of 30% to 40% by the absorbtion of water at a temperature of 80° C. to 90° C. Here, the raw coffee beans are contacted with water of a quantity previously determined experimentally. The raw coffee beans are kept moving continuously so that the water is evenly and completely absorbed, i.e. no hydrosoluble substances must be allowed to be extracted. When the raw coffee beans have absorbed the predetermined quantity of water, i.e. when the water content has reached a level of 30% to 45%, the beans are treated with saturated steam as taught by the invention.

The most important achievement of the invention is that Robusta coffees obtained from Robusta coffee beans treated in this way have lost the specific Robusta-characteristic "earthy" and "musty" note. These Robusta coffees are found to have a pleasant flavor, hardly at all tasting of Robusta any more. Because the unpleasant aroma note which is characteristic of Robusta coffee can not be removed to a satisfactory extent in any other way, the invention represents a substantial progress in the field of improving the quality of Robusta coffee.

In view of the known processes for improving the quality by steam-treating the raw coffee beans, which fail to remove the Robusta characteristic unpleasant taste, the achievement of the process as taught by the invention is quite surprising.

Robusta coffees whose raw beans have been treated under the same pressure and duration conditions as taught by the invention. but at low temperatures—i.e. below approx. 135° C.—still noticeably taste "earthy" and "musty", even if the treatment periods are extended.

Even if the treatment temperatures are above 140° C., an unpleasant aftertaste is still noticeable ("process taste"), even with shorter treatment periods, i.e. below approx. 60 min. This shows that it is essential and critical to observe the specified temperature, pressure and treatment time ranges and their combination as taught by the invention in order to achieve the surprising quality improvement of Robusta coffee.

Tests were conducted to find out what causes this surprising success of the process as taught by the invention. These tests showed that when the teachings of the invention were exactly complied with as regards process conditions, a certain compound was removed which is likely to be responsible for the unpleasent flavor note. This compound is 2-methylisoborneol (exo-1, 2, 7, 7-tetramethylbicyclo (2.2.1) heptane-2ol).

2-methylisoborneol was identified in coffee by means of gas chromatography and mass spectrometry. Although 2-methylisoborneol is a known compound, it has not been known or described heretofore as an aroma-impact component of Robusta coffee.

After the compound had been identified by the tests conducted in connection with the process of the invention and after it had also been separated, sensorial threshold tests in water were conducted, which showed that a concentration of approx. 2.5 ppt to 5 ppt 2-methylisoborneol in water leaves a significant "earthy" and "musty" impression which means that even extremely low quantities of 2-methylisoaborneol borneol are sensorially noticeable and consequently affect the flavor.

The tests conducted in connection with the present invention have finally also confirmed that 2-methylisoborneol is still detectable in Robusta coffees not treated as taught by the invention after roasting, which means that said compound is not removed therewith.

The process as claimed by the invention will be explained in more detail below with the aid of two examples.

EXAMPLE 1

10 kg of Indonesian Robusta raw coffee are charged to a 50 l autoclave. For a period of 10 min, steam having a temperature of 115° C. to 135° C. is introduced into the autoclave. The pressure in the pressure vessel rises to 3.1 bar. The raw coffee beans are continuously moved about in the autoclave, so that the water is evenly absorbed. After 10 min the water content of the raw coffee beans has risen to 35%.

Subsequently, saturated steam having a temperature of 135° C. is passed through the beans for 90 min, the pressure in the pressure vessel being 3.1 bar. The steam is passed through the autoclave at 10.2 l/h. After 90 min of the saturated steam, the steam influx is stopped, but for a period of another 7 min the steam still present in the autoclave is drawn off.

The steam-treated Robusta coffee is then dried back to a water content of 10% in a fluidized bed dryer and subsequently roasted to a medium-grade color value. The roasted sample is tasted and compared to the original. The "earthy" and "musty" taste typical for Robusta coffee is practically unnoticeable. Coffee experts find a substantial quality improvement compared to the original.

The roasted sample was tested for 2-methylisoborneol with the two-dimensional GC (Sichromat of the firm Siemens) and by means of a sniffing-analysis. While 0.6 ppb (ug/kg roasted coffee powder) 2-methylisoborneol were detected in the original, no 2-methylisoborneol could be found in the sample treated according to the invention, the analytically detectable minimum being 0.05 ppb (ug/kg roasted coffee powder).

EXAMPLE 2

10 kg of Indonesia Robusta raw coffee are charged to a 50 l autoclave. For a period of 20 min to 30 min, water having a temperature of 80° C. to 90° C. is introduced into the autoclave at a flow rate of about 6.3 l/h. The raw coffee beans are kept moving continuously so that the water is evenly and completely absorbed and no extraction occurs. After 2.6 kg of water have been introduced for a period of 20 min to 30 min and completely absorbed by the raw coffee beans, the water content of the raw coffee beans is raised to approx. 40%.

Then, saturated steam having a temperature of 135° C. to 40° C. is introduced. When the pressure in the autoclave has reached about 3.1 bar, a valve is opened at the autoclave exit and saturated steam is passed through the beans. The process is conducted according to the conditions as specified in example 1. As in example 1, the steam-treatment is followed by a drying step in the fluidized bed dryer and the roasting process.

No 2-methylisoborneol could be found in the roasted sample by means of analytical methods.

Apparatuses for conducting the process of the invention can be designed in different ways. The drawing schematically shows a preferred apparatus.

The raw coffee beans are treated in an autoclave 10, which comprises an agitator 11 driven by a motor 12. Raw coffee can be charged and discharged via a closable port in the autoclave 10 which is not shown in the drawing.

In the lower part of the autoclave, that is to say at its bottom, there is a feed line 13 with an (electromagnetic) control valve 14. An exhaust line 15, also having a control valve 16, connects to the upper part of the autoclave 10, in the present case to an upper end wall. The exhaust line 15 leads to a conventional condenser 17.

According to the invention, the complete process including pretreating the beans to increase their water content is conducted in one and the same vessel, namely the autoclave 10. For this purpose, steam is introduced into the autoclave 10 via the feed line 13 after the Robusta coffee a beans have been charged to the vessel. At this stage the exhaust line 15 is closed. During this steam-treatment, the coffee beans in the autoclave 10 are continuously moved about by the agitator 11.

When the water content of the coffee beans has reached the desired level, the exhaust line 15 is opened. Now, saturated steam is introduced into the autoclave 10 via the feed line 13, specifically at a temperature ranging from 135° C. to 140° C. and at a pressure ranging from 3 bar to 4 bar. The treatment lasts approx. 60 min to 120 min. Via the exhaust line 15, the saturated steam passed through the beans reaches the condenser where it is condensed.

In the first phase of the treatment, water instead of steam may be introduced into the autoclave; again via the feed line 13. In this alternative method for increasing the water content, the beans are also moved about by the agitator 11. A possible surplus of water can be drained via the feed line 13 after the water content of the beans has reached the desired level. Subsequently, the beans are steamed in the afore-described way.

What is claimed is:

1. A process for improving the quality of Robusta coffee by treating raw Robusta coffee beans with steam at elevated temperatures and elevated pressure and subsequently roasting said beans, comprising the steps of increasing the water content of the Robusta coffee beans to a level ranging from 30% to 45% and subsequently treating the coffee beans with saturated steam having a temperature ranging from 135° C. to 140° C. at a pressure ranging from 3 bar to 4 bar for a time period of 40 min to 120 min, especially for removing 2-methylisoborneol.

2. The process as claimed in claim 1, wherein steam is passed through the Robusta coffee beans having an increased water content.

3. The process as claimed in claim 2, wherein the treatment is conducted with saturated steam having a temperature of about 138° C.

4. The process as claimed in claim 3, wherein the pressure is 3.1 bar to 3.6 bar during the treatment with saturated steam.

5. The process as claimed in claim 4, wherein the treatment with saturated steam is conducted for a time period ranging from 75 min to 90 min.

6. The process as claimed in claim 5, wherein the Robusta coffee beans are continuously moved about during the treatment with saturated steam.

7. The process as claimed in claim 6, wherein subsequent to the treatment with steam, the Robusta raw coffee beans are dried to a moisture content ranging from 8% to 12%.

8. The process as claimed in claim 7, wherein Robusta coffee beans having a low water content are enriched with water up to a water content ranging from 30% to 45% by means of steam at elevated temperatures and elevated pressure.

9. The process as claimed in claim 7, wherein Robusta coffee beans having a low water content are enriched with water up to a water content ranging from 30% to 45% by means of an absorption of water having a temperature 80° to 90° C., such that a quantity of water is added to the ordinary Robusta coffee beans which under the chosen conditions is completely absorbed by the raw coffee.

10. The process as claimed in claim 9, wherein the treatment for increasing the water content of the Robusta coffee beans as well as the subsequent treatment of said beans with saturated steam is conducted in one and the same vessel.

11. The process as claimed in claim 1, wherein the treatment is conducted with saturated steam having a treatment of about 138° C.

12. The process as claimed in claim 1, wherein the pressure is 3.1 bar to 3.6 bar during the treatment with saturated steam.

13. The process as claimed in claim 1, wherein the treatment with saturated steam is conducted for a time period ranging from 75 min to 90 min.

14. The process as claimed in claim 1, wherein the Robusta coffee beans are continuously moved about during the treatment with saturated steam.

15. The process as claimed in claim 1, wherein subsequent to the treatment with steam, the Robusta raw coffee beans are dried to a moisture content ranging rom 8% to 12%.

16. The process as claimed in claim 1, wherein Robusta coffee beans having a low water content are enriched with water up to a water content ranging from 30% to 45% by means of steam at elevated temperatures and elevated pressure.

17. The process as claimed in claim 1, wherein Robusta coffee beans having a low water content are enriched with water up to a water content ranging from 30% to 45% by means of an absorption of water having a temperature of 80° to 90° C., such that a quantity of water is added to the ordinary Robusta coffee bans which under the chosen conditions is completely absorbed by the raw coffee.

18. The process as claimed in claim 1, wherein the treatment for increasing the water content of the Robusta coffee beans as well as the subsequent treatment of said beans with saturated steam is conducted in one and the same vessel.

19. The process as claimed in claim 1, wherein Robusta coffee beans having a low water content are enriched with water up to a water content ranging from 30% to 45% by means of steam at 135° C., and 3.1 bar.

* * * * *

UNITED STATES PATENT AND TRADEMARK OFFICE
CERTIFICATE OF CORRECTION

PATENT NO. : 5,019,413

DATED : May 28, 1991

INVENTOR(S) : Becker et al.

It is certified that error appears in the above-identified patent and that said Letters Patent is hereby corrected as shown below:

In column 6, line 42, amend "bans" to --beans--.

Signed and Sealed this

Fifth Day of January, 1993

*Attest:*

DOUGLAS B. COMER

*Attesting Officer*     *Acting Commissioner of Patents and Trademarks*